(12) United States Patent
Wienecke et al.

(10) Patent No.: US 10,137,844 B2
(45) Date of Patent: *Nov. 27, 2018

(54) VEHICLE CAMERA HAVING MOLDED INTERCONNECT DEVICE

(71) Applicant: MAGNA ELECTRONICS INC., Auburn Hills, MI (US)

(72) Inventors: Richard Wienecke, Goldbach (DE); Michael Biemer, Aschaffenburg-Obernau (DE); Ruediger Boegel, Großostheim (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/784,226

(22) Filed: Oct. 16, 2017

(65) Prior Publication Data

US 2018/0072239 A1    Mar. 15, 2018

Related U.S. Application Data

(63) Continuation-in-part of application No. 14/814,883, filed on Jul. 31, 2015, now Pat. No. 9,961,241.

(60) Provisional application No. 62/517,333, filed on Jun. 9, 2017, provisional application No. 62/414,932, filed on Oct. 31, 2016, provisional application No.
(Continued)

(51) Int. Cl.
*B60R 11/04* (2006.01)
*H04N 5/225* (2006.01)
*B60R 11/00* (2006.01)

(52) U.S. Cl.
CPC .......... *B60R 11/04* (2013.01); *H04N 5/2252* (2013.01); *H04N 5/2253* (2013.01); *H04N 5/2254* (2013.01); *B60R 2011/004* (2013.01); *B60R 2011/0043* (2013.01); *B60R 2300/8066* (2013.01)

(58) Field of Classification Search
CPC .......................... H04N 5/2252; H04N 5/2253
See application file for complete search history.

(56) References Cited

U.S. PATENT DOCUMENTS

| 5,550,677 A | 8/1996 | Schofield et al. |
| 5,670,935 A | 9/1997 | Schofield et al. |
| 5,949,331 A | 9/1999 | Schofield et al. |

(Continued)

*Primary Examiner* — Tat C Chio
(74) *Attorney, Agent, or Firm* — Honigman Miller Schwartz and Cohn, LLP

(57) ABSTRACT

A camera for a vision system of a vehicle includes a housing having a front housing portion and a rear housing portion and configured to be disposed at a vehicle so as to have a field of view interior or exterior of the vehicle. The camera includes a connector portion for electrically connecting circuitry of the camera to an electrical connector of the vehicle when the camera is disposed at the vehicle. The front housing portion houses a lens assembly. A MID (Molded Interconnect Device) frame includes electrically conductive traces and is integrated in the rear housing portion with circuit board connecting elements and connector connecting elements exposed at an inner surface of the rear housing portion. The connector portion includes terminals that contact respective exposed connector connecting elements of the MID frame to electrically connect the connector portion terminals to circuitry of the circuit board via the MID frame.

20 Claims, 22 Drawing Sheets

Related U.S. Application Data

62/408,951, filed on Oct. 17, 2016, provisional application No. 62/032,660, filed on Aug. 4, 2014.

(56) References Cited

U.S. PATENT DOCUMENTS

| | | |
|---|---|---|
| 7,965,336 B2 | 6/2011 | Bingle et al. |
| 8,503,061 B2 | 8/2013 | Uken et al. |
| 8,542,451 B2 | 9/2013 | Lu et al. |
| 8,866,907 B2 | 10/2014 | McElroy et al. |
| 9,233,641 B2 | 1/2016 | Sesti et al. |
| 9,277,104 B2 | 3/2016 | Sesti et al. |
| 9,609,757 B2 | 3/2017 | Stegerwald |
| 2009/0244361 A1 | 10/2009 | Gebauer et al. |
| 2011/0310248 A1 | 12/2011 | McElroy et al. |
| 2012/0117745 A1 | 5/2012 | Hattori |
| 2013/0222595 A1 | 8/2013 | Gebauer et al. |
| 2013/0242099 A1 | 9/2013 | Sauer et al. |
| 2013/0328672 A1 | 12/2013 | Sesti et al. |
| 2013/0344736 A1 | 12/2013 | Latunski |
| 2014/0071279 A1 | 3/2014 | Mokashi |
| 2014/0138140 A1 | 5/2014 | Sigle |
| 2014/0184881 A1* | 7/2014 | McKinley ............ H04N 5/2253 348/345 |
| 2014/0320636 A1 | 10/2014 | Bally et al. |
| 2014/0362209 A1 | 12/2014 | Ziegenspeck et al. |
| 2014/0373345 A1 | 12/2014 | Steigerwald |
| 2015/0222795 A1 | 8/2015 | Sauer et al. |
| 2015/0266430 A1 | 9/2015 | Mleczko et al. |
| 2015/0321621 A1 | 11/2015 | Van Dan Elzen et al. |
| 2015/0365569 A1 | 12/2015 | Mai et al. |
| 2016/0037028 A1* | 2/2016 | Biemer ................ H04N 5/2252 348/148 |
| 2016/0268716 A1 | 9/2016 | Conger et al. |
| 2016/0280150 A1* | 9/2016 | Steinberger ............ B60R 11/04 |
| 2017/0133811 A1 | 5/2017 | Conger et al. |
| 2017/0295306 A1 | 10/2017 | Mleczko et al. |

* cited by examiner

Fisheye camera:

Rear view mirror camera:
(optic acentrically shifted relative to the imager)

InCabin camera:

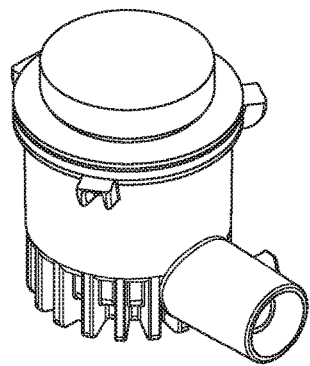
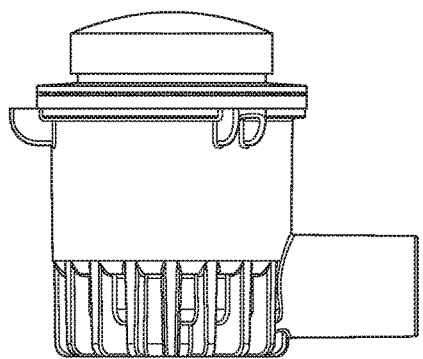
FIG. 16          FIG. 17
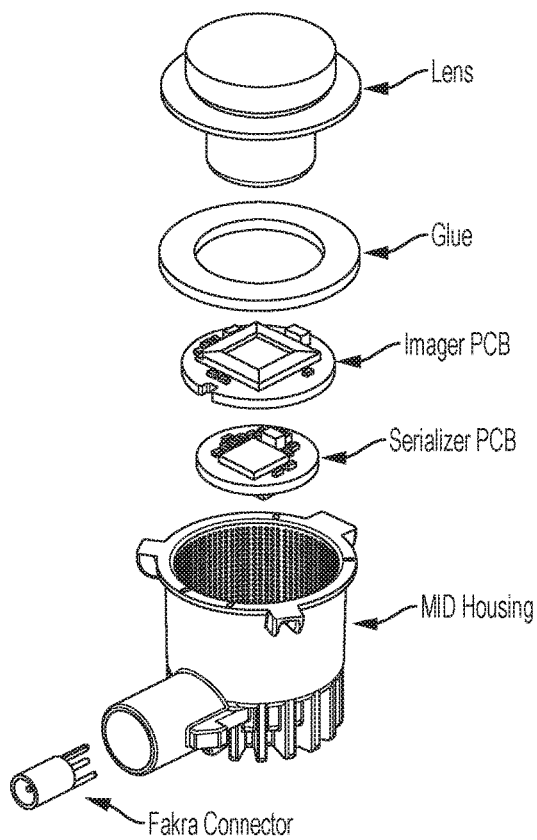
FIG. 18

VEHICLE CAMERA HAVING MOLDED INTERCONNECT DEVICE

CROSS REFERENCE TO RELATED APPLICATIONS

The present application claims the filing benefits of U.S. provisional applications, Ser. No. 62/517,333, filed Jun. 9, 2017, Ser. No. 62/414,932, filed Oct. 31, 2016, and Ser. No. 62/408,951, filed Oct. 17, 2016, which are hereby incorporated herein by reference in their entireties. The present application is also a continuation-in-part of U.S. patent application Ser. No. 14/814,883, filed Jul. 31, 2015, which claims the filing benefits of U.S. provisional application Ser. No. 62/032,660 filed Aug. 4, 2014, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and provides a camera that has its housing formed or made as a MID (Molded Interconnect Device) structure using MID technology.

These and other objects, advantages, purposes and features of the present invention will become apparent upon review of the following specification in conjunction with the drawings.

BRIEF DESCRIPTION OF THE DRAWINGS

FIG. 16 is another perspective view of the camera of FIG. 13;

FIG. 17 is a side elevation of the camera of FIG. 13;

FIG. 18 is an exploded perspective view of the camera of FIG. 13;

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
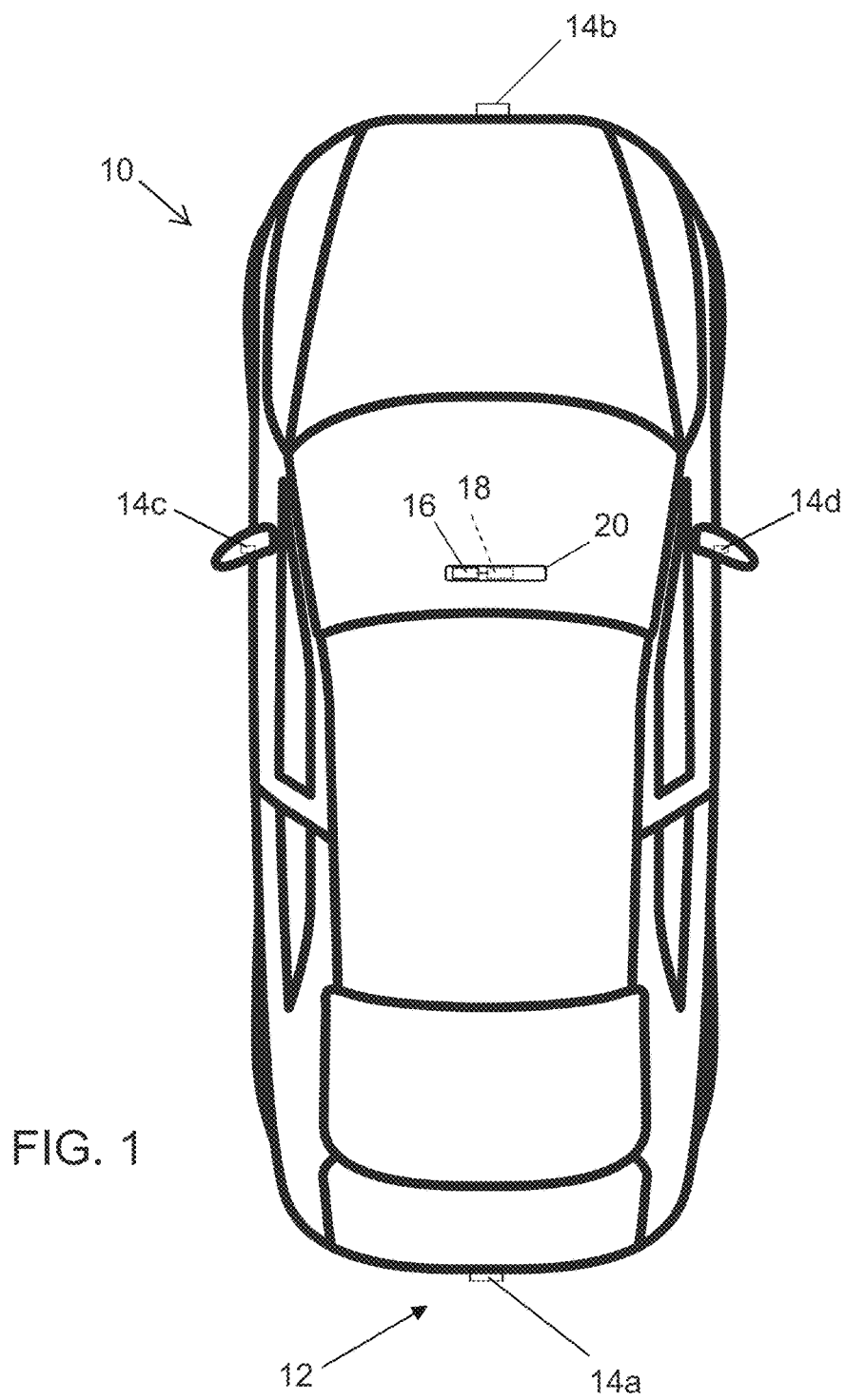
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forward facing camera 14b at the front (or at the windshield) of the vehicle, and a sideward/rearward facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The present invention provides a camera housing with its inner surface having electrical conducting structures made by molded interconnect device (MID) technology, such as the camera's lead frame and interconnections between electrical components. The electrical components may be applied directly onto the camera housing's routing structure. The camera may not include any PCB or may have some of the electronic components borne by the MID structure and one or more additional PCBs may bear additional electronic components. The potential additional PCBs may be attached to the lead frame routing structure of the housing by reflow soldering, press fit, welding or bonding or the like.

The camera housing may be made completely in MID or may consist of several MID parts or one or more parts with MID and one or more additional parts without MID. The cost with the MID piece should always be as small as possible while larger structures may be done without MID. In cases where there are more than one camera housing parts in use for completing a camera housing, the interconnection between these parts may be done by MID structures, which may be applied on the edges or made as the connector structure or the like. When applied on the edges, the different part's structures may face and engage one another when assembling. For example, circuitry or conductive elements may be established using MID technology at both the front housing portion and the rear housing portion, whereby respective conductive elements or traces of the front and rear housing portions electrically connect when the front and rear housing portions are mated or assembled together or attached/sealed together. For example, one of the circuit boards (e.g., the imager circuit board) may be disposed at the front housing portion, or the front housing portion may include heating elements for heating the lens assembly, with the heating elements being electrically conductively connected to the electrically conductive traces of the MID frame of the front housing portion, which are electrically conductively connected to the MID frame of the rear housing portion when the front and rear housing portions are mated together.

Optionally, the connector structure may be formed as a single piece with the camera housing. The connector structure's lead frame may be designed by conducting MID material. When having a coaxial connector structure, the lead frame of the shielding contact may be made by MID and the core pin socket (or pin) as well. Optionally, the core pin socket (or pin) may be added by insertion molding or press fit, welded or soldered onto the structure while the shielding may be still made by MID.

The camera may utilize aspects of vehicle vision cameras having Molded Interconnected Devices (MID), such as by utilizing aspects of cameras of the types described in U.S. Publication No. US-2016-0037028, which is hereby incorporated herein by reference in its entirety. The camera may also utilize aspects of cameras of the types described in U.S. Pat. No. 8,866,907 and/or U.S. Publication Nos. US-2017-0295306; US-2016-0268716; US-2015-0222795; US-2015-0321621 and/or US-2013-0242099, and/or U.S. provisional application Ser. No. 62/508,575, filed May 19, 2017, which are all hereby incorporated herein by reference in their entireties.

Figure 2:
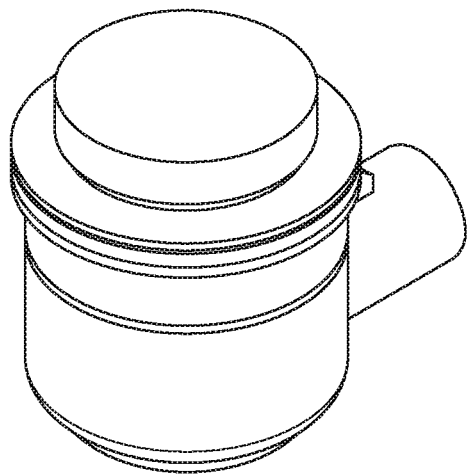
FIG. 2 is a perspective view of a camera having a MID connector at two circular printed circuit boards (PCBs)
Figure 2A:
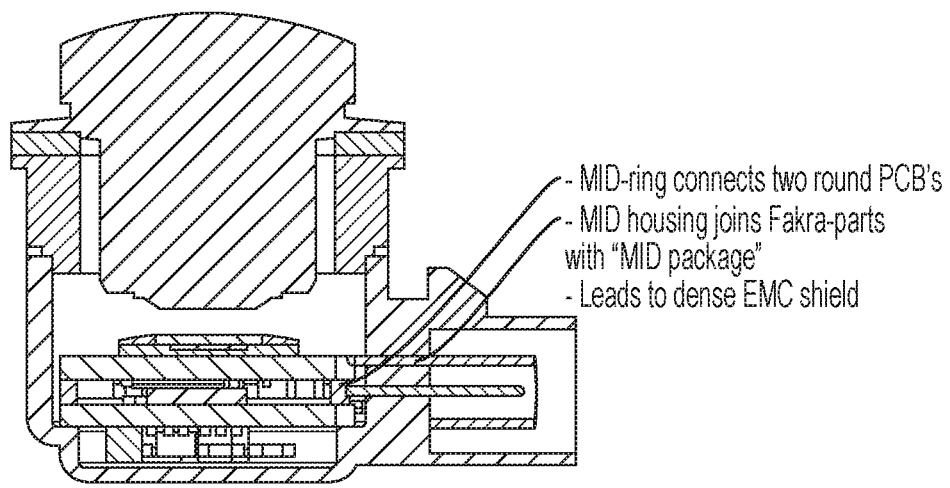
FIG. 2A is a sectional view of the camera of FIG. 2.

The PCB interconnection of the MID cameras described in the above incorporated U.S. Publication No. US-2016-0037028 are interconnected via the inner camera housing wall which has MID lead frame structures. The further developed camera in accordance with the present invention comprises as a first aspect an interconnection piece comprising a MID structure, optionally formed in a ring shape or rectangle frame like shape for interconnecting the PCBs directly and closer together, which saves space and improves the EMC properties (see FIGS. 2 and 2A). Optionally, using such a MID interconnection piece, the camera housing may be made in a conventional way without the use of MID. Optionally, the MID connection piece or optionally an additional MID piece may be made in a shape and may comprise the contact nodes for being aligned with nodes of a camera connector, which may optionally be applied by press fit or optionally may be applied by insertion molding. As discussed in the above incorporated U.S. Publication No. US-2016-0037028, the connector may comprise a partial or fully done MID structure by itself or as part of the outer connector structure molded onto the camera body. The inventive PCB interconnection concept by using an MID piece may especially find use in cameras made by over-molding, such as described in the above incorporated U.S. Publication No. US-2017-0295306.

Figure 4:
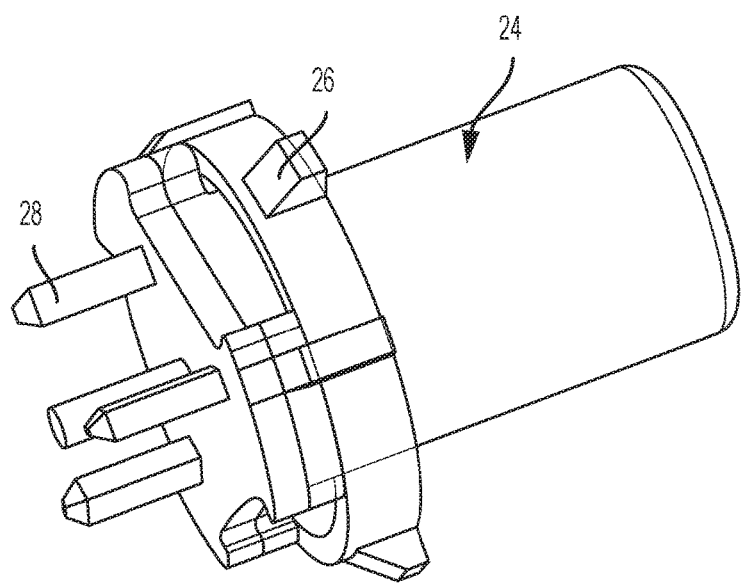
FIG. 4 is a perspective view of an assembled connector having a round shape with radial distributed snap clips.

Optionally, the assembled connector 24 may have a round shape with radial distributed snap clips 26, such as shown in FIG. 4. The connector 24 includes a plurality of terminals 28 extending axially from the end of the connector for making electrical connection when the connector is plugged into or snapped into the camera housing via the snap clips.

Figure 5:
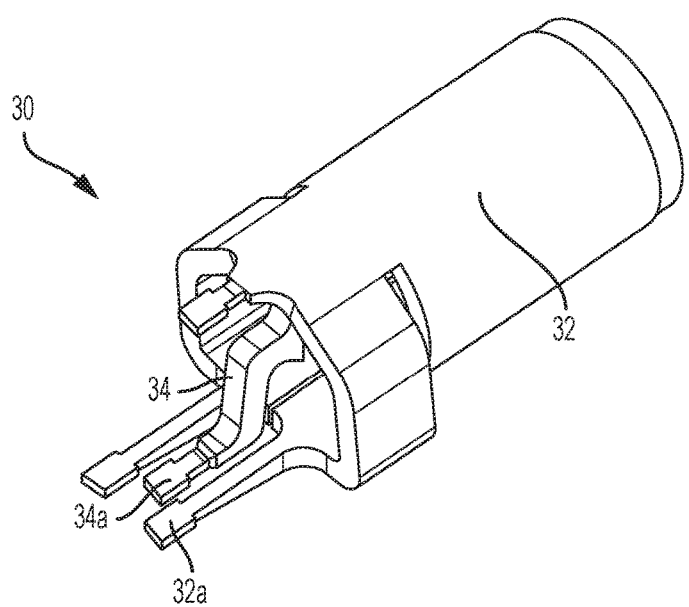
FIG. 5 is a perspective view of a connector comprising a metal stamping and folding part.
Figure 6:
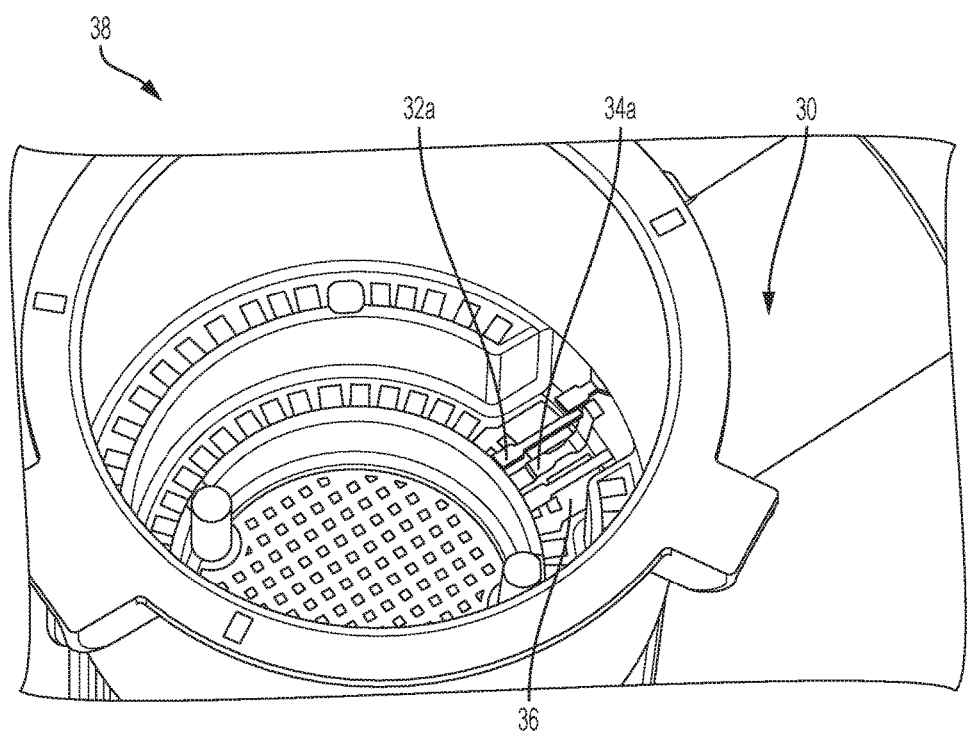
FIG. 6 is a perspective view of a MID lead frame of the housing, showing connector elements for soldering at pad like areas of the connector of FIG. 5.

Optionally, the connector may comprise a metal stamping and folding part, such as shown in FIG. 5. There the connector is a coaxial connector 30 with a stamped and folded shield piece 32 and a stamped and bent core piece 34, both having at least one pad like area 32a, 34a suitable for being soldered onto the MID lead frame 36 of the housing 38 (such as shown in FIG. 6) or a lead frame of the optional PCB interconnector MID piece or being soldered directly to one of the PCBs pads.

In accordance with another aspect of the invention, the MID camera bodies may optionally have more than one MID mold layer for enabling crossing routing structures, creating routing layers and optionally embedding electrical components. This may lead to the possibility of creating complex circuits without having PCBs or with a reduced number of PCBs within the camera, which may enable very small cameras with compact electronics circuits. Optionally, different MID methods may come into use at once. Optionally, LDS (LASER activated compound) and 2K (metalized compound combined with non-metalized compound) in combination, for saving Laser time.

In accordance with another aspect of the invention, a MID camera structure may house optionally more than one imager and/or optionally more than one lens optics. Optionally, such a bi- or tri- or quad-MID camera may find use as a side camera of a vehicle. Optionally, the side cameras may serve as far rear view camera in combination with a surround view fish eye camera optionally in combination with a blind spot camera and optionally in combination with a forward vision camera. Optionally, the forward vision camera may be one of a stereo MID camera pair in combination with another side camera or bi- or tri- or quad-side cameras identical to the said option above. Optionally, the MID camera body structure may house one or more additional non-visual or non-imaging sensor(s), such as LIDAR (optionally divided in a LASER and a Time Of Flight camera housed in the same or different camera bodies or on the counter camera housing body on the other vehicle side), ultrasonic sensor(s) or RADAR sensor(s). The sensors' electrical circuits, shielding connectors and heating elements may comprise partially or fully by mono or multilayer MID lead frames or circuits or optionally may have embedded electrical components conducted by MID as well. The cameras and sensors electronics may be conjoined to one for synergy and space saving.

Figure 3A:
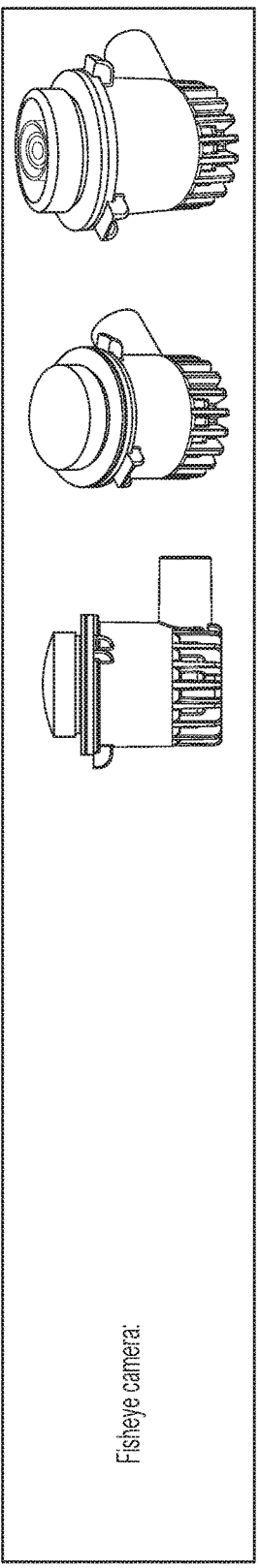
FIGS. 3A-C are views of different cameras of the present invention, including a fisheye camera (FIG. 3A), a rearview mirror camera (FIG. 3B) and an in-cabin camera (FIG. 3C)
Figure 3B:
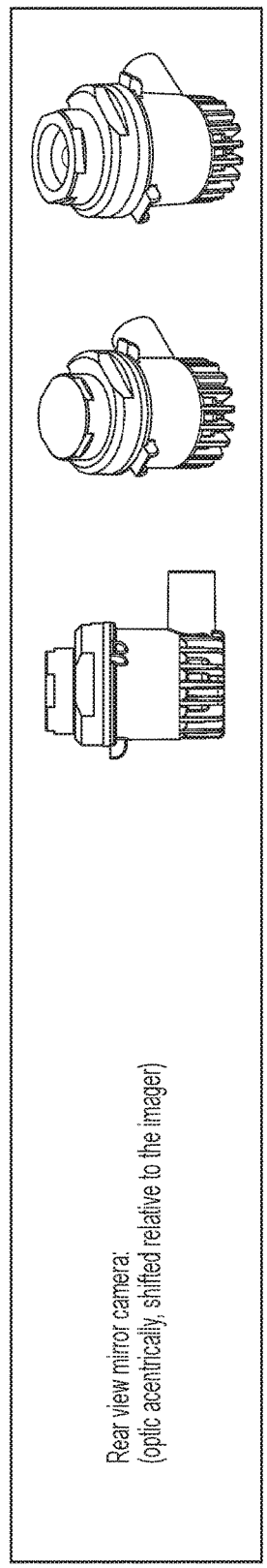
Figure 3C:
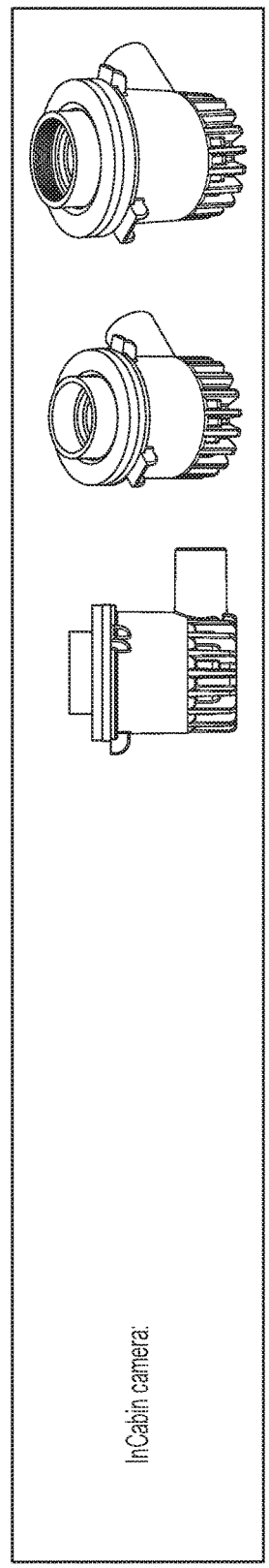

In accordance with another aspect of the invention, for increasing the number of identical MID camera body parts ('unibody), there may be the possibility to assemble different optic types, especially types used in automotive vision such as optionally, fish eye lens optics (FIG. 3A), normal optics for in cabin cameras (FIG. 3C) and optics for side view mirror cameras (FIG. 3B), which optionally have a shift or tilt-shift optics and optionally a fisheye lens or a wide angle lens with low tailoring beyond f-Theta, such as can be seen with reference to FIGS. 3A-C. In case of a tilt shift camera, the tilting may be achieved by tilting the plane of the housing shoulder the imager PCB is soldered to.

In accordance with another aspect of the invention, the camera image quality camera body mold may comprise LCP—Vetra E840i LDS which has a low CTE (coefficient of linear thermal expansion (average)) a high thermal conductivity, high tensile modules, a low humidity and water absorption, which are all positive properties compared to usual PBTs.

Figure 7:
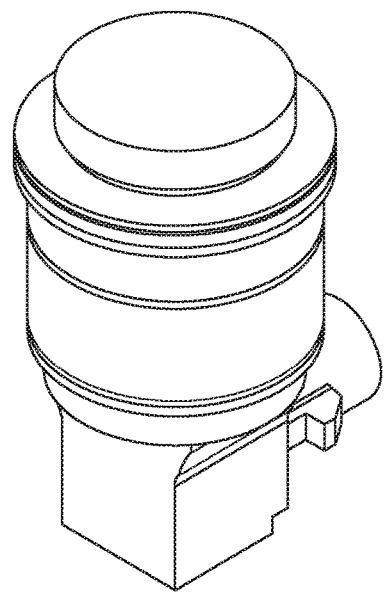
FIG. 7 is a perspective view of another camera of the present invention.
Figure 8A:
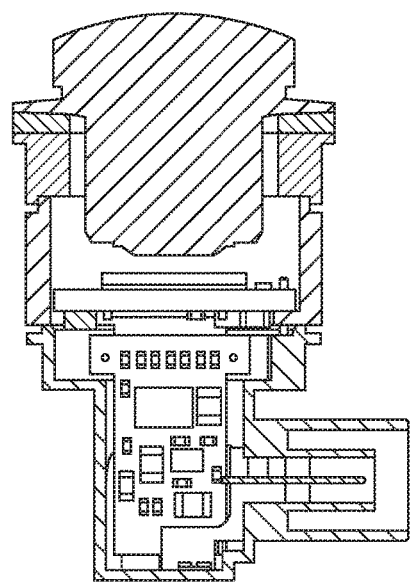
FIG. 8A is a sectional view of the camera of FIG. 7.

Optionally, and such as shown in FIGS. 7 and 8A, the camera may have the imager PCB lying horizontal and with the imager aligned with the lens, and may have two vertical PCBs that are connected via a MID-part to the imager PCB. An additional MID part may be provided to connect the PCBs to an electrical connector (such as a Fakra connector). The housing where the imager PCB is disposed may comprise aluminum and may have a metal spring. The camera may include two MID parts (one for connecting the PCBs to the imager PCB and another for connecting the PCBs to an electrical connector) or the lower portion of the camera in FIG. 8A may comprise a MID part that provides for electrical connection of the vertical PCBs to both the imager PCB and to the electrical connector. The camera may have a diameter of around 20 mm and a height of around 35 mm including the lens (or around 19 mm without the lens).

Figure 8B:
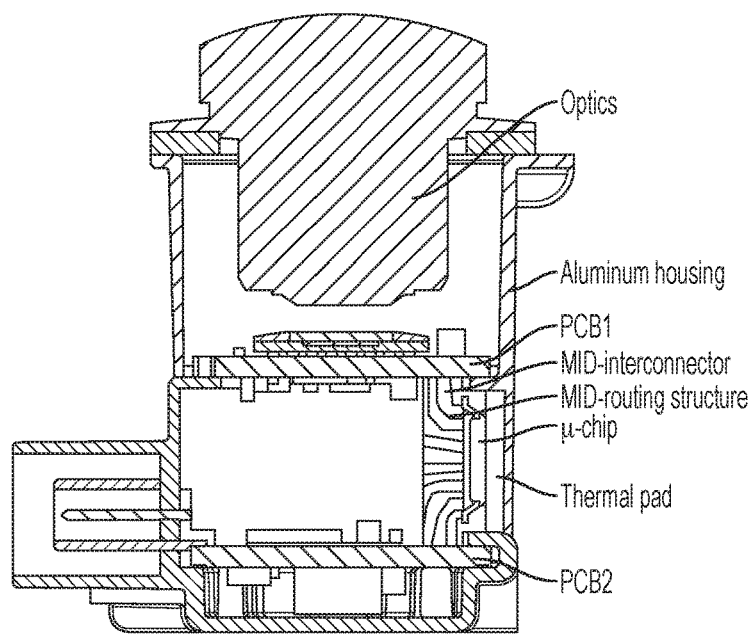
FIG. 8B is a sectional view of a camera which has two PCBs (PCB 1 and PCB 2) and a MID interconnector that also serves as a PCB at which a μ-chip is mounted vertically that is thermally conducted to the aluminum camera housing via a thermal pad.

Optionally, such as shown in FIG. 8B, the camera may have one or multiple PCBs (PCB 1 and PCB 2 in FIG. 8B) and a MID interconnector that also serves as a PCB since a µ-chip is mounted vertically on it. Since the µ-chip is at and along the housing wall there is a large surface at which heat can be transmitted. The camera housing may comprise a good heat conducting molding compound or metal, such as steel or aluminum, and by that may have enhanced heat transmitting. To optimize the heat flow there may be thermal pad or compound or thermal fleece such as being out of Pyrolytic Graphite Foils (PGS) between the µ-chip and the housing wall as shown in FIG. 8B. Optionally, the MID interconnector that also serves as PCB may have also contact to the connector portion similar to the camera shown in FIGS. 5, 6, 8A and 10.

Figure 9:
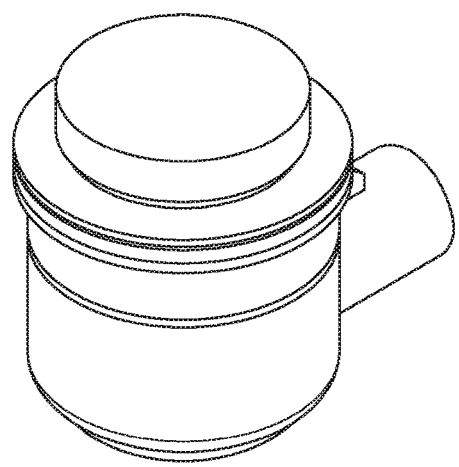
FIG. 9 is a perspective view of another camera of the present invention.
Figure 10:
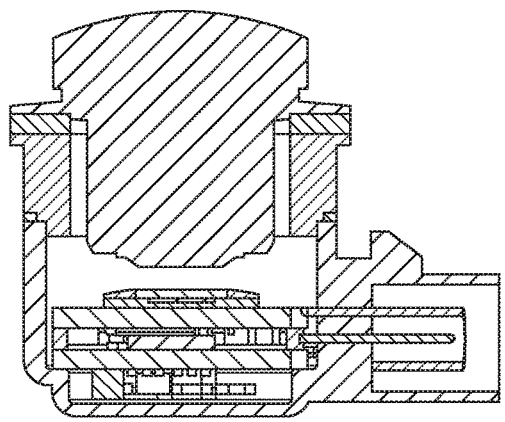
FIG. 10 is a sectional view of the camera of FIG. 9.

Optionally, and such as shown in FIGS. 9 and 10, the camera may have a MID connector ring or square that electrically connects the imager PCB with the connector PCB (and may have a MID lens holder). The MID housing joins the connector (e.g., Fakra) parts with the PCBs. Such a construction may provide dense MID EMC shielding. The camera may have a diameter of around 20 mm and a height of around 24 mm including the lens (or around 7-8 mm without the lens).

Figure 11:
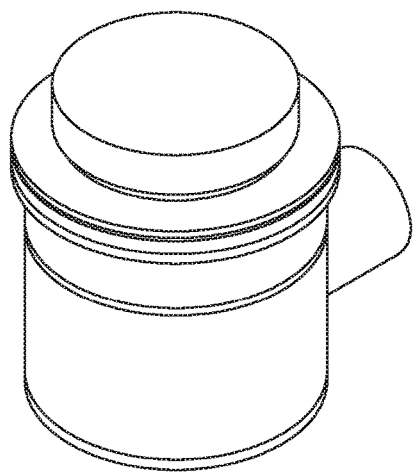
FIG. 11 is a perspective view of another camera of the present invention.
Figure 12:
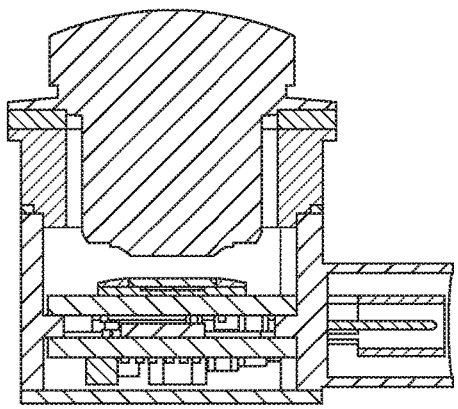
FIG. 12 is a sectional view of the camera of FIG. 11.
Figure 13:
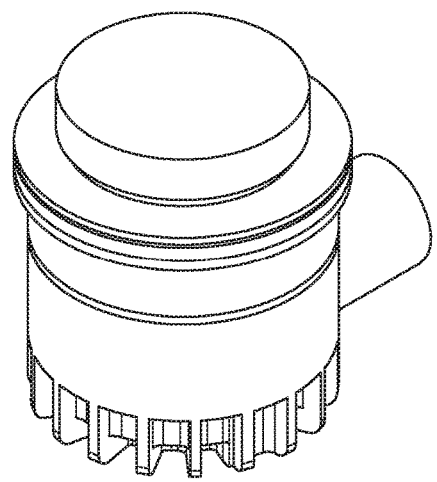
FIG. 13 is a perspective view of another camera of the present invention.
Figure 14:
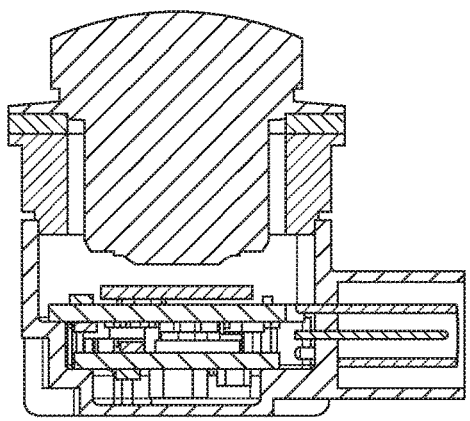
FIG. 14 is a sectional view of the camera of FIG. 13.
Figure 15:
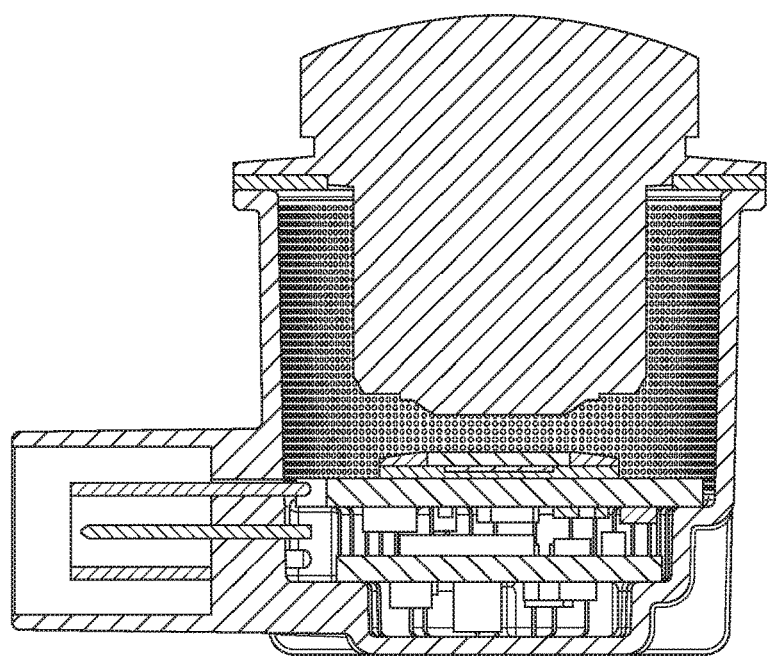
FIG. 15 is another sectional view of the camera of FIG. 13.
Figure 19:
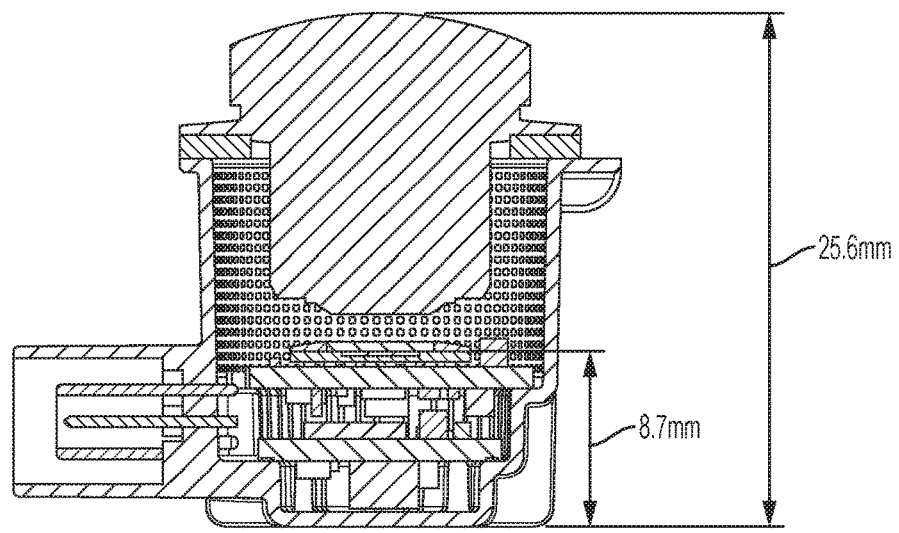
FIG. 19 is another sectional view of the camera of FIG. 13.
Figure 20:
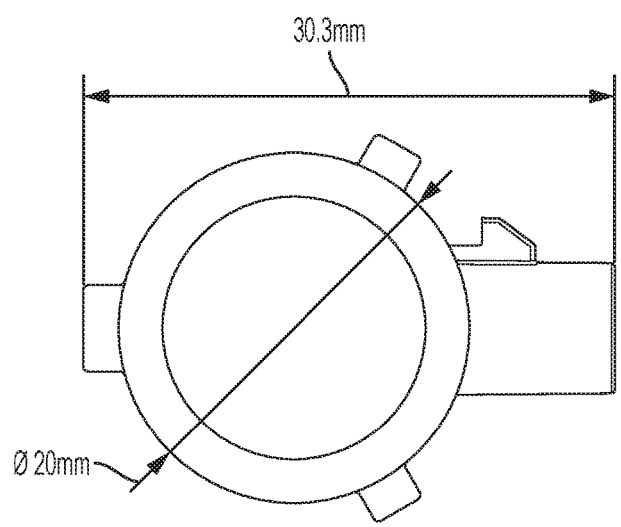
FIG. 20 is a top plan view of the camera of FIG. 13.

Optionally, and such as shown in FIGS. 11 and 12, the camera may have a MID housing that acts as a general distributor for PCBs positioned at an internal MID ring. Such a construction may provide more PCB surface for the lower (non-imager) PCB, since the two PCBs may be of similar size. Such a construction may also require a cover at the bottom to allow for insertion of the lower PCB at the bottom (while having insertion of the imager PCB from the top (before the lens holder is attached at the housing)). Optionally, the camera may include MID EMC shielding. The camera may have a diameter of around 20 mm and a height of around 24 mm including the lens (or around 7-8 mm without the lens).

Optionally, and such as shown in FIGS. 13-20, the camera may have a MID housing that receives a smaller (serializer) PCB and a larger (imager) PCB from one direction (the upper portion in FIG. 14), with both PCBs resting at respective MID portions of the housing. Such a construction allows for highly automated camera assembly processing (e.g., such as "pick and place" processing and vapor phase soldering process that solders the PCBs to the MID connectors all around the PCB at its interface with the MID housing). Optionally, the camera may include cooling fins at the lower region. The connector (such as a Fakra connector with terminals or pins) may be attached at the connector portion of the housing, whereby the terminals or pins engage and contact and electrically connect with connector portions of the MID housing (and may be pressed-in and soldered to the housing). The camera may have a diameter of around 20 mm and a height of around 24-26 mm including the lens (or around 7-9 mm without the lens).

Figure 21:
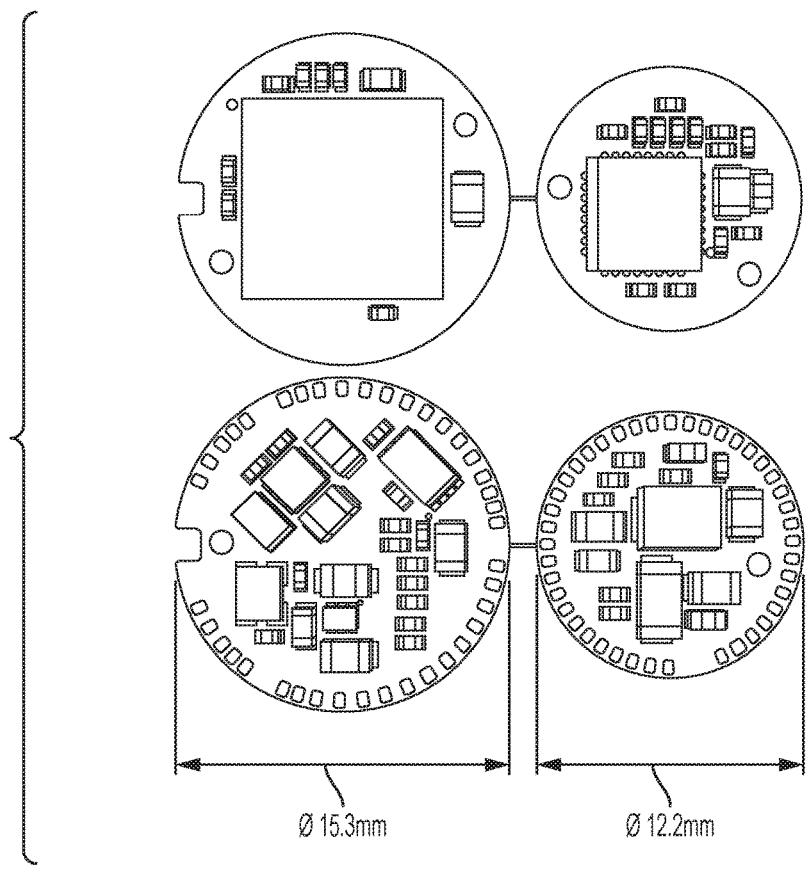
FIG. 21 shows plan views of the imager PCB and the connector PCB of the camera of the present invention.

As shown in FIG. 21, the two PCBs (imager PCB on the left and serializer PCB on the right) are different sizes/diameters so that their electrical connections (see lower images in FIG. 21) disposed around their peripheries electrically connect with MID connectors at different shelves or levels of the camera housing. No board-to-board or board-to-Fakra connectors are necessary with this design. The camera provides optimized connector routing due to the contact possibilities all around the PCBs. The camera provides for exchanging components with smaller equivalents, such as power supply and filter coil.

Thus, the camera of the present invention comprises a substantially smaller camera as compared to other vehicle cameras. For example, a typical vehicle camera may have a square camera housing of around 30×30 mm or more, with a depth (including connector and lens) of up to around 45-50 mm. As discussed above, the MID cameras provide a circular or cylindrical housing having a diameter of around 20 mm and an overall camera height or depth (including the connector and lens) of less than around 30 mm.

The MID cameras may provide a fisheye lens, with a connector position/orientation independent from the PCB layout due to the MID routing possibilities, which provides enhanced freedom to handle packaging needs. The camera provides for universal style alignment processes (for different types/styles/designs of cameras). The single piece housing may have MID EMC shielding. The camera design provides for camera sealing through lens alignment, with no additional processes required.

As discussed above, the camera housing may comprise a good heat conducting molding compound or metal, such as steel or aluminum, and by that may have enhanced heat transmitting. For applying MID structures onto the housing's inner wall, one or multiple foils with lead structures separated by additional insulating foils to insulate from one another and the possibly conducting housing (when the housing may be a metal) may be laminated onto the camera housing and or the camera's inlays, connectors, optics or PCBs. For laminating, it is advantageous when the edges at which the laminate foil(s) get folded are straight. The third dimension is irrelevant to the bending. Because of that, the inner shape of the camera may show straight edges, especially at portions at which lead structures get applied by laminating. Because of this requirement, the camera according this aspect of the invention may have rectangle proportions, such as shown in the FIGS. 27A, 27B, 28A, 28B, 30A and 30B. The bending edges in the camera in FIG. 29 are also straight, though the camera body has a half oval body, but it is rectangle from the side view.

Figure 30A:
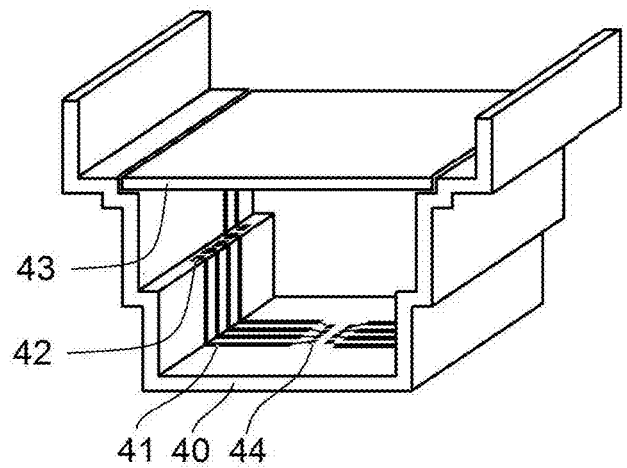
FIG. 30A is a front-side perspective view of an aluminum camera body with laminated lead structures.
Figure 30B:
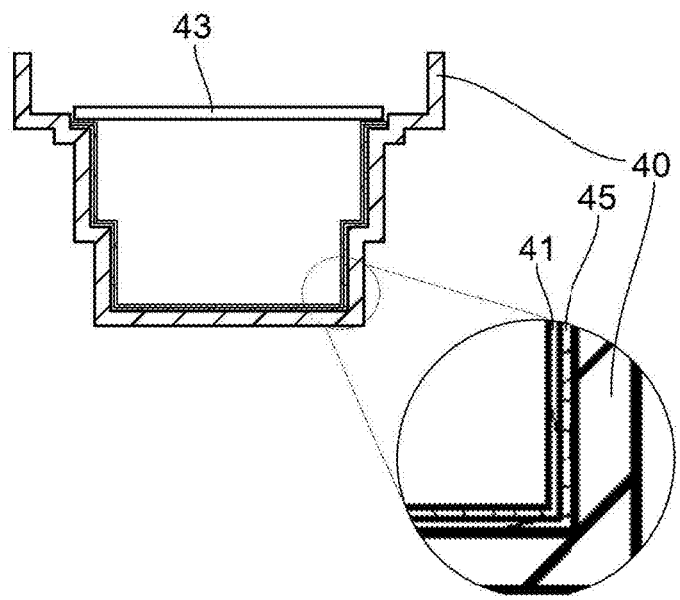
FIG. 30B is a cross sectional view of the camera body of FIG. 30A, with an encircled close-up.

FIG. 30A shows an aluminum camera body 40 with laminated lead structures 41 which extend across the bottom area, the walls and the shoulders at which the PCBs rest. The top PCB 43 is shown applied and the bottom PCB is shown non-applied, exposing the pads 42 on the shoulders which may conduct counter pads on the PCB past reflow. The pads 44 may be formed for applying an active electronics element, such as a μ-chip with its typical foot print arrangement applied as MID lead frame. FIG. 30B shows the encircled area magnified. The foil 45 may comprise an insulating material on top of the aluminum housing 40 while the foil 41 may be conducting lead structures.

Alternatively, the lead structures may be formed directly on top of the camera body (inside) material. A photo sensitive coating that is (electrically) insulating by nature may be applied by being sprayed onto the inner camera's housing wall, inlays, connectors, optics and/or PCBs. The coating becomes conducting after being exposed to ultraviolet (UV) light and developed or cured. Underneath the photo sensitive coating, there may be an (electrically) insulating layer, such as another coating or a foil, when the housing wall is chosen by a conducting material. When more layers are desired, multiple layers of photo sensitive coatings separated by (electrically) insulating layers may be applied in a stack.

Figures 27A, 27B:
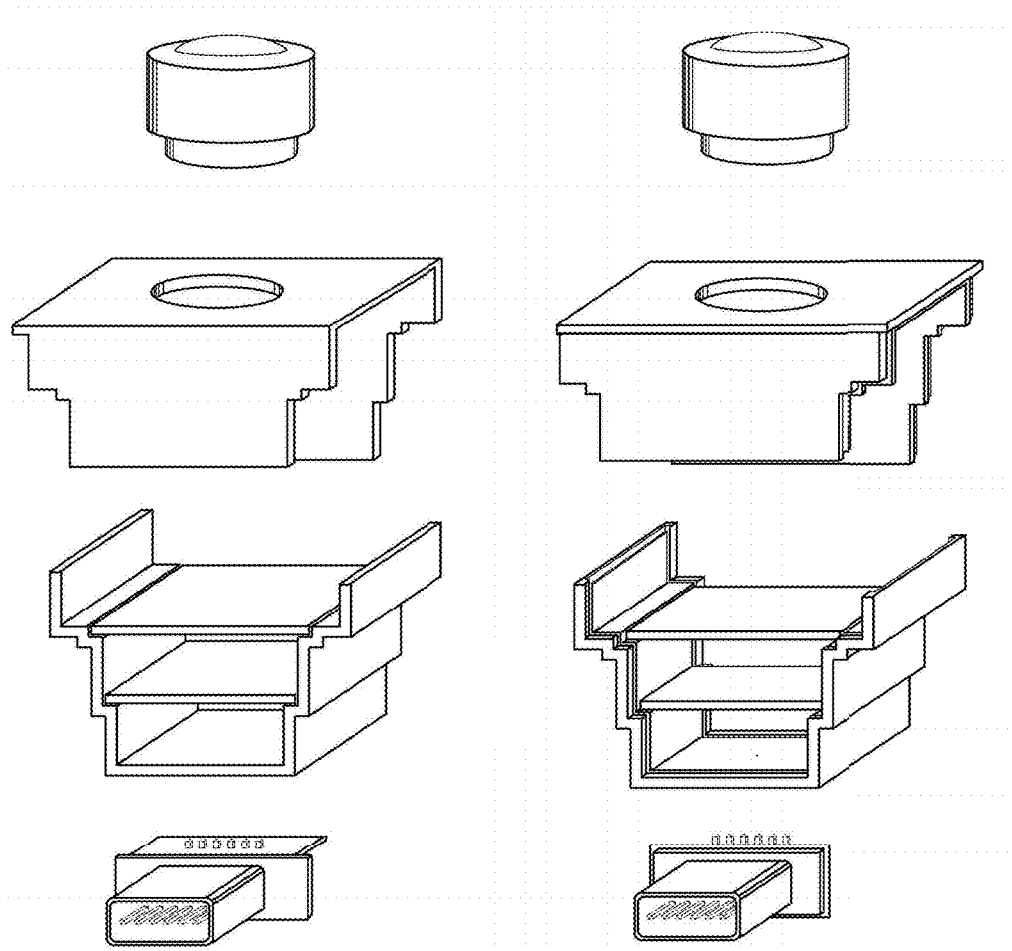
FIGS. 27A and 27B are exploded perspective views of aluminum camera bodies done by profile extrusion (without lead structures, thermal paste and electronic components)
Figures 28A, 28B:
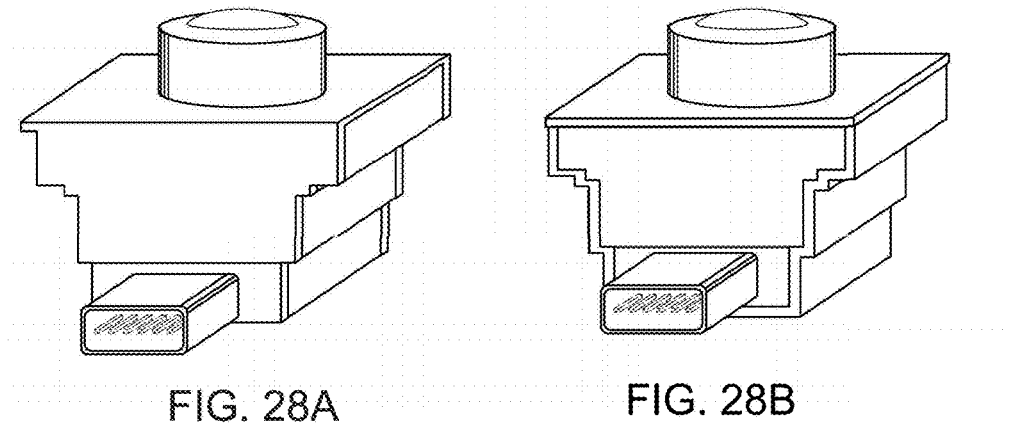
FIGS. 28A and 28B are perspective views of the assembled camera bodies of FIGS. 27A and 27B, respectively.
Figure 29:
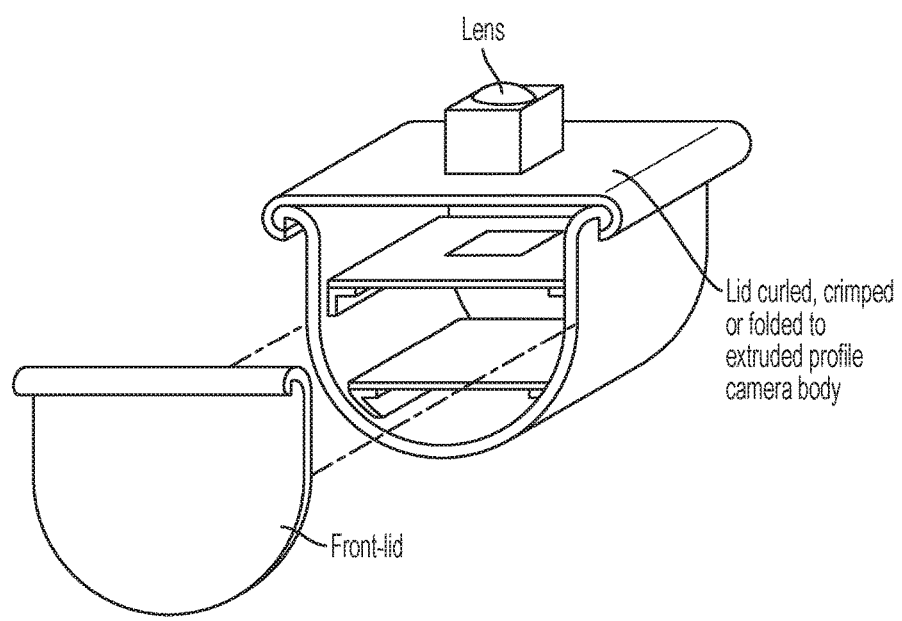
FIG. 29 is a perspective view of a half oval camera body having a front lid and a rear lid and a top lid, where the top lid may be applied by curling, crimping or folding.

As additional aspect of the invention and common to the examples of FIGS. 27A, 27B, 28A, 28B, 29, 30A and 30B, the camera body may be formed as an extruded profile. The extruded profiles may comprise a plastic compound, aluminum or a composite (of multiple materials). Extruded profiles typically have a two dimensional (2D) shape or profile that stays steady or constant across its selected or selectable lengths. As shown in FIGS. 27A, 27B and 29, the extruded profiles need additional parts to close them. As shown in FIGS. 27A and 27B the camera may have a top lid (lens holder piece), which carries the lens stack, with two side walls that fit into the gaps of the extruded bottom profile for closing it at opposite sides. The camera of FIGS. 27B and 28B has a groove for supporting the top lid's wall positioning. Both cameras of FIGS. 27A, 28A and 27B, 28B include a connector structure that has a portion that fits to the housing wall to close the camera. The connector of FIGS. 27B and 28B rests in the grooves of the top camera body and grooves of the bottom camera body piece. The tightening of these extruded profiles cameras may be done by a coating on top or a sealing material in the grooves. As shown in FIG. 29, the top lid (lens holder piece) may be applied by curling, crimping or folding, such as described in the above cited U.S. Publication No. US-2017-0295306. Optionally, the curled, crimped or folded lids may be applied to the camera body out of an extruded profile.

Figure 22:
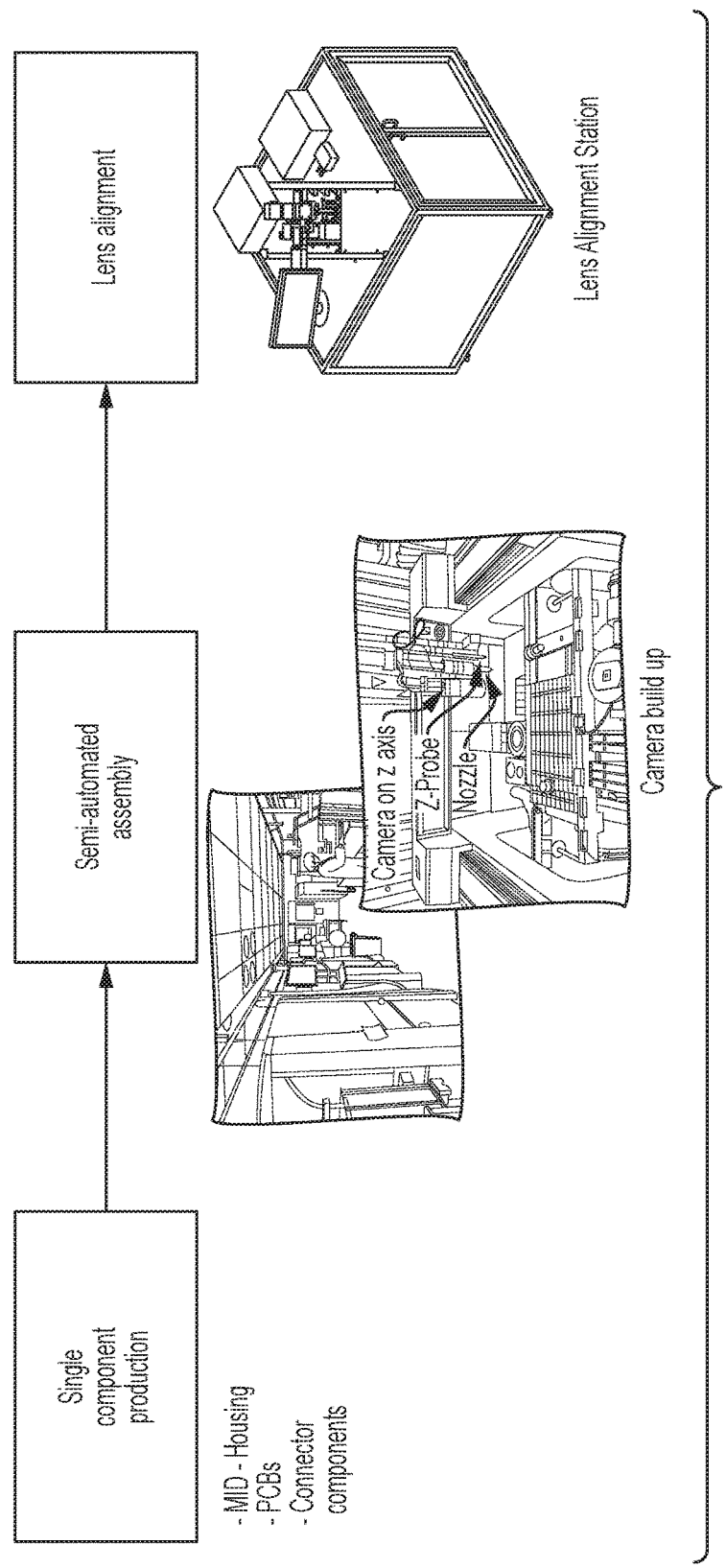
FIG. 22 is a block diagram of an assembly process for assembling the camera of the present invention.
Figure 23:
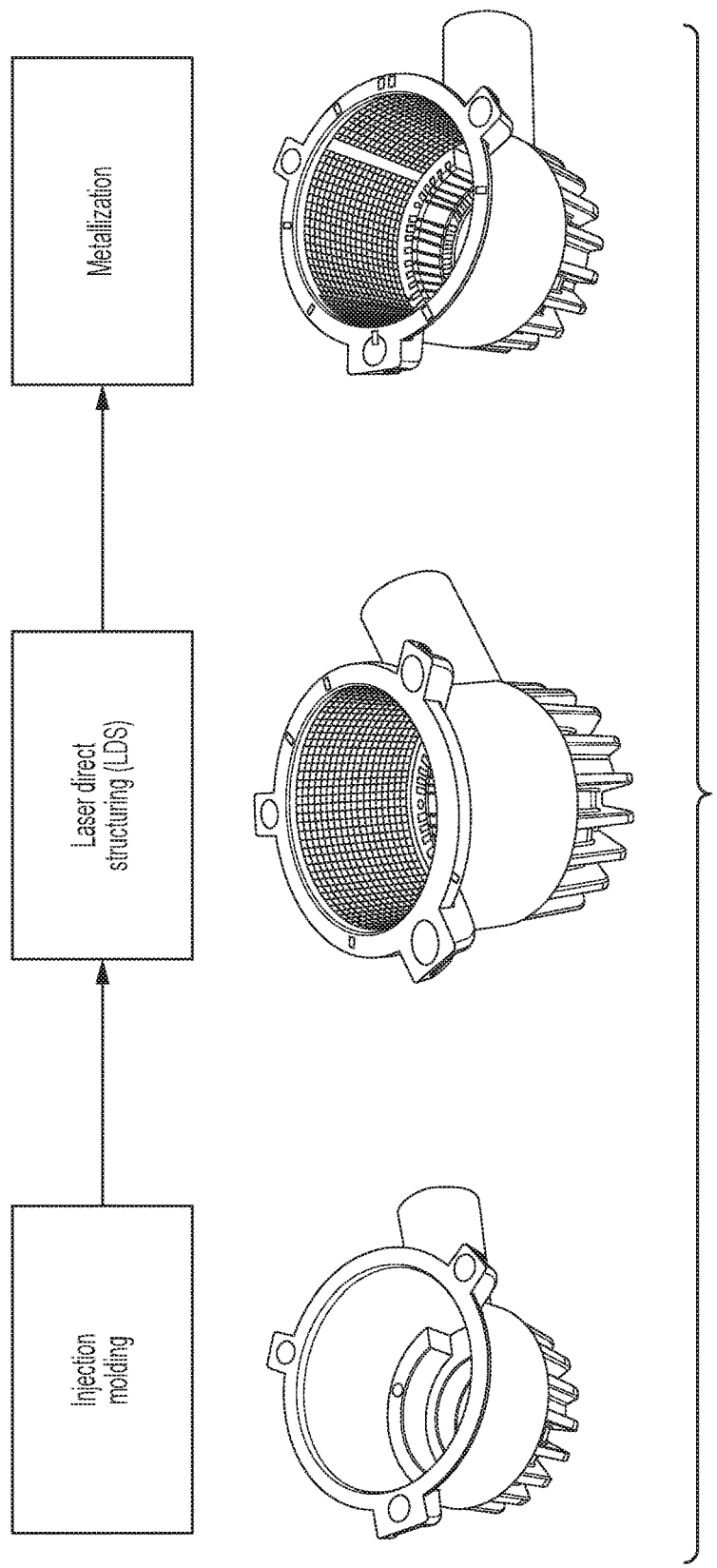
FIG. 23 shows perspective views of the camera housing at different stages of its manufacturing.

FIG. 22 shows an optional manufacturing process for assembling the camera and performing lens alignment (where the lens is optically aligned and centered at the imager before the lens holder or lens is fixed relative to the housing and imager. As shown in FIG. 23, the MID housing may be injection molding a laser direct structuring (LDS) material, which has additives that can be activated via a laser beam. The process then includes laser direct structuring of the molded housing, where conductive traces (which may be modeled via a computer aided design (CAD) system) are drawn onto the molded part via a laser beam. The part is then metallized with electrically conductive materials, such as copper, nickel, gold and/or other sufficiently electrically conductive materials.

Figure 24:
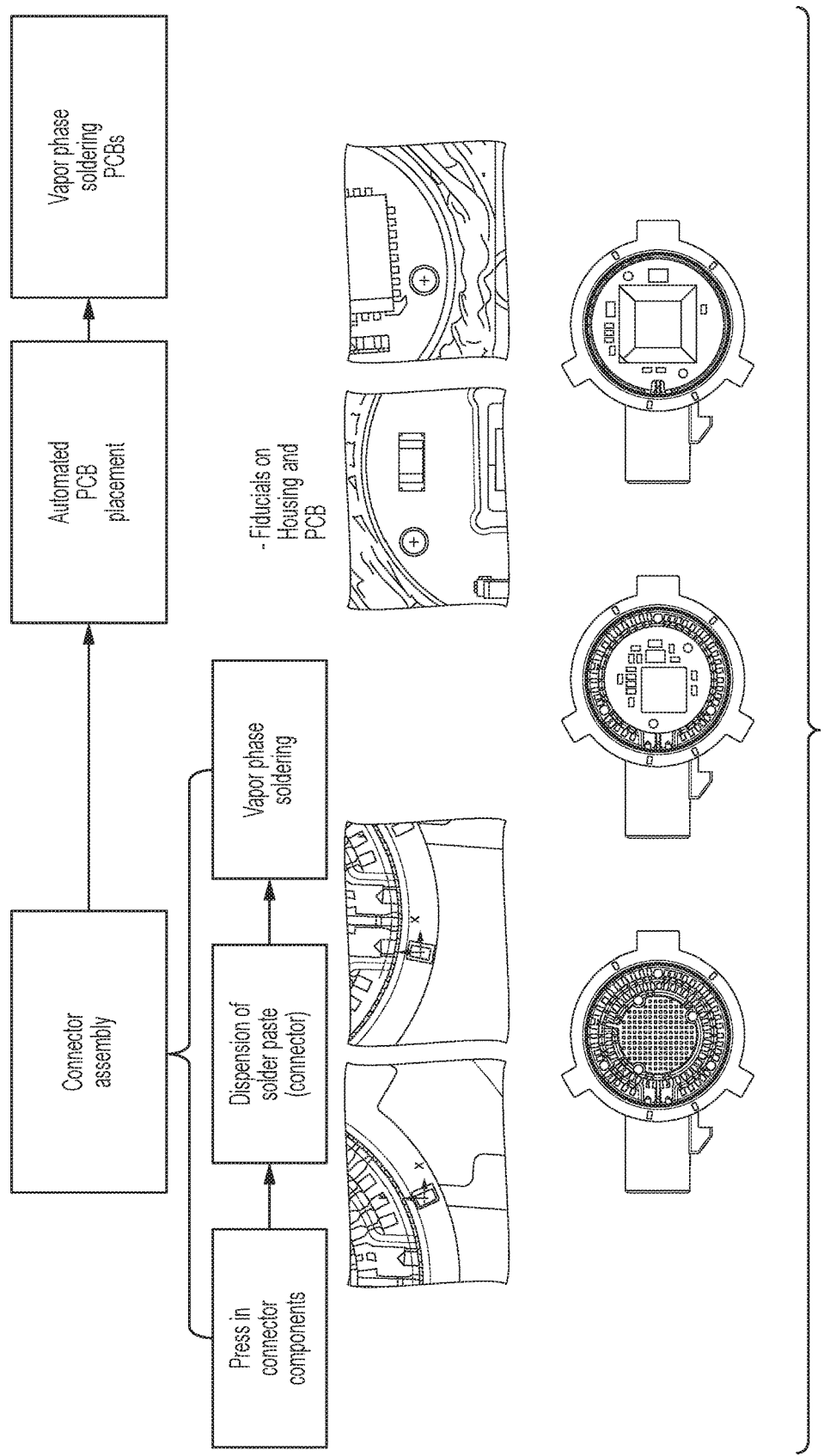
FIG. 24 shows assembly processes for assembling the PCBs in the camera housing in accordance with the present invention.
Figure 25:
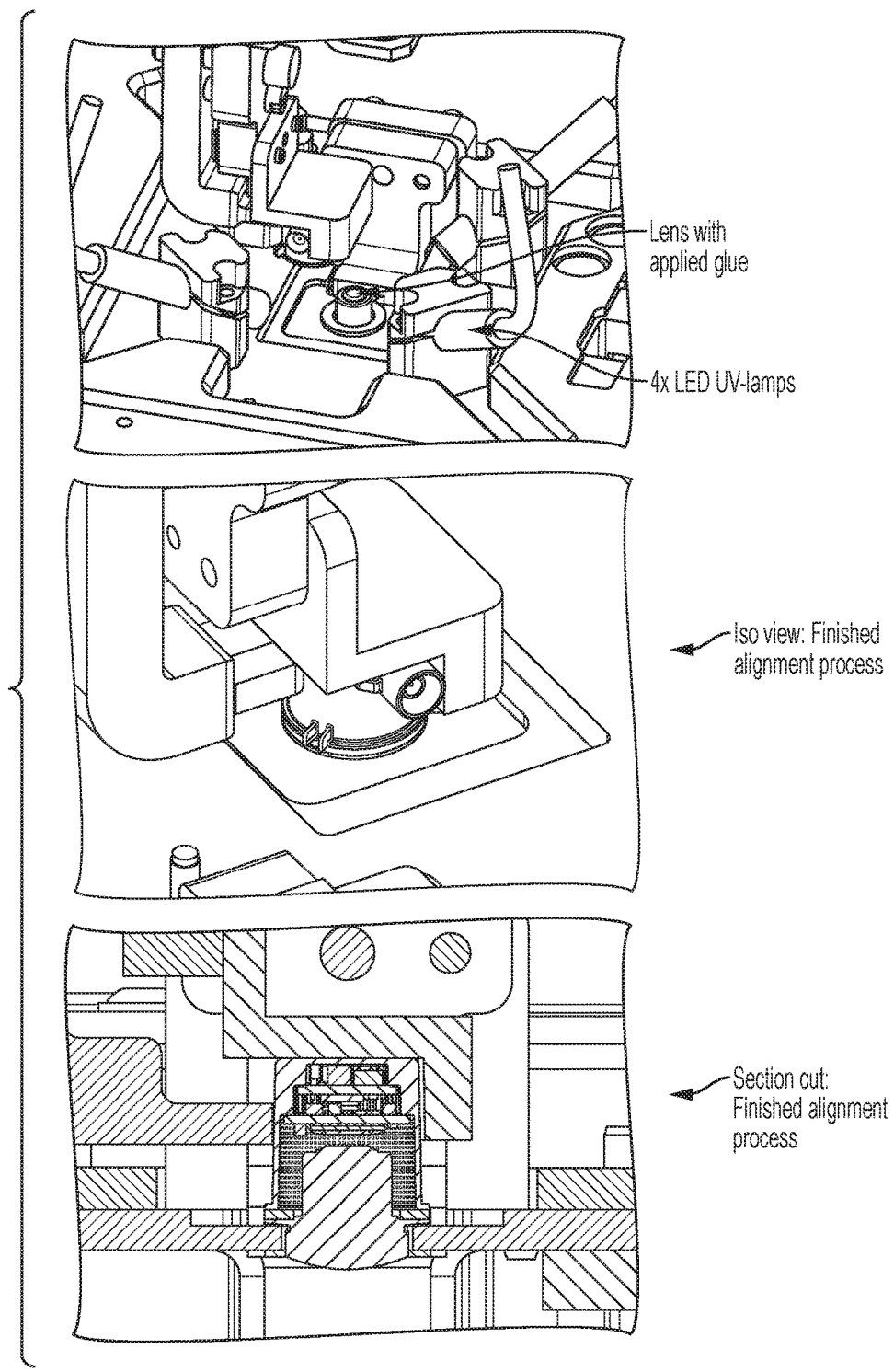
FIG. 25 shows processing steps for aligning the lens with the imager of the camera of the present invention.
Figure 26:
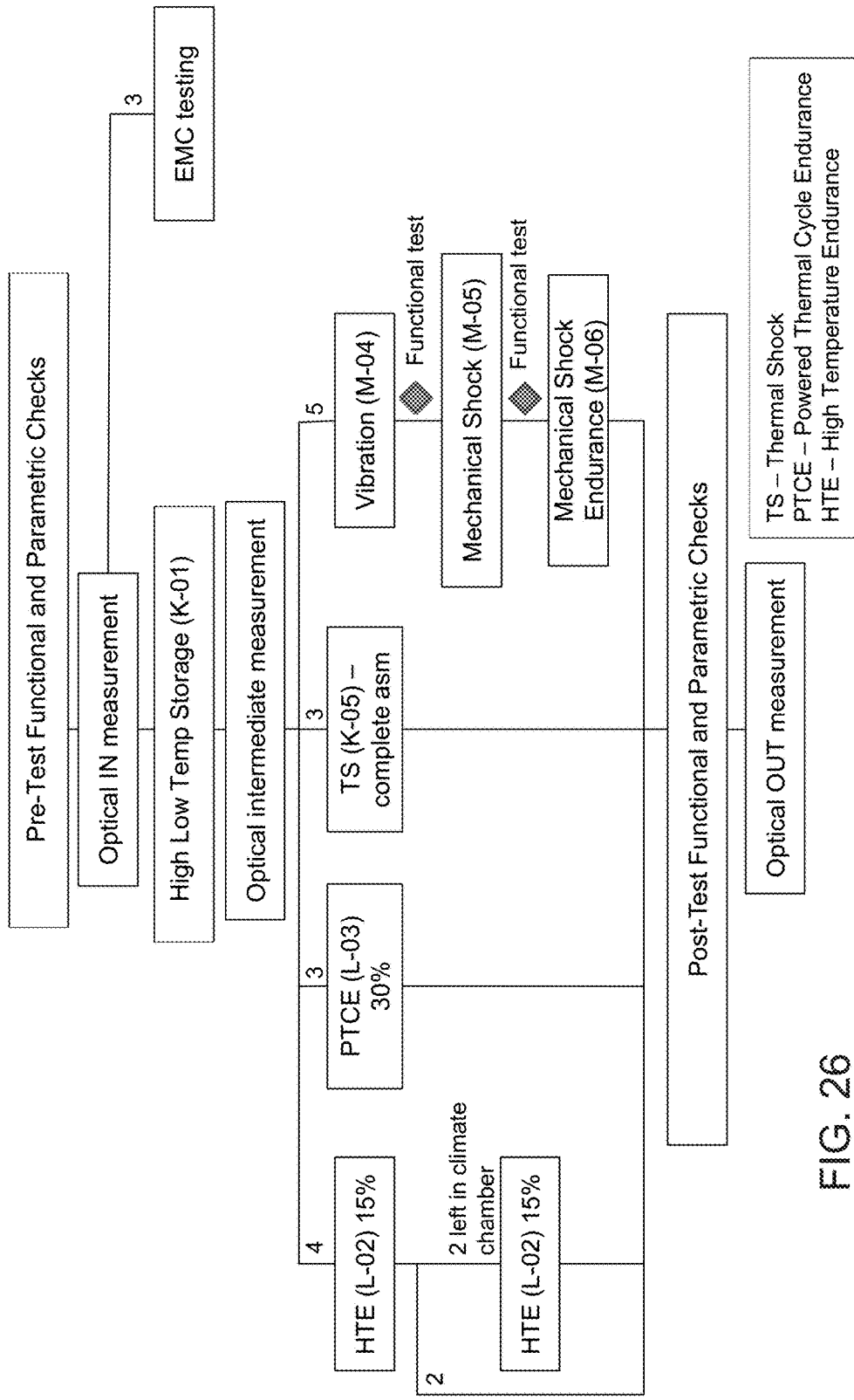
FIG. 26 is a block diagram of a test flow concept validation for the camera of the present invention.

As shown in FIG. 23, the PCBs may then be placed into the metallized MID housing and soldered therein, such as via vapor phase soldering. The placement of the PCBs and soldering may be automated, with both PCBs being inserted into the housing from the same end with no separate electrical connectors between the PCBs. As shown in FIG. 24, the attachment of the lens at the housing may comprise a semi-automated process. The lens and housing may be placed by an operator, with the lens fixed when facing targets and with the camera is fixed at a movable gripper of the alignment station. Glue is applied at the lens collar, and the grippers may be tightened (such as by an operator), whereby the automated alignment process is started. The adhesive may be pre-cured using four LED UV-lamps and may be finally cured in an oven (such as by utilizing aspects of the camera assembly processes described in U.S. Pat. Nos. 8,542,451 and 9,277,104, which are hereby incorporated herein by reference in their entireties).

Thus, the present invention provides for a miniaturized vehicle camera that may achieve reductions of around 70 percent in volume of the camera without the lens and around 50-60 percent in volume of the camera with the lens. The PCBs may be reduced in size by around 30 percent. The camera is assembled using fewer process steps and allows for highly automated processing, with the assembly of the PCBs to the housing being possible with a typical pick and place machine. Thus, the smaller, easier assembled camera may provide a significant cost savings over conventional larger cameras.

Additionally, the MID camera provides significant reduction in the coefficient of linear thermal expansion or CTE (and thus has a smaller influence on image quality under temperature). For example, the MID camera may have a CTE of around 19, which is about ¼ that of a known lens holder. The camera also has enhanced thermal conductivity (around 0.36 W/mk as compared to 0.26 W/mk), enhanced temperature of deflection under load (HDT/A) (around 227 at 1.8 MPa as compared to around 120), enhanced tensile modulus (around 9600 Mpa as compared to 7300 Mpa), and enhanced moisture absorption (around 0.004 percent as compared to 0.06 percent). The MID camera material also has enhanced (such as a factor of 10) behavior with respect to water absorption (around 0.011 percent compared to 0.1 percent).

Thus, the present invention provides for a small camera design (a reduction of about 70 percent in volume and 32 percent in PCB area), with a reduced number of parts (single piece housing with MID EMC shielding). The MID camera avoids the need for any separate internal connectors (neither PCB-to-PCB nor PCB-to-Fakra connectors are required). The MID camera construction allows for multiple camera applications to be realized with a single enclosure design and the same assembly process. The MID camera also provides enhanced material properties, with less impact from environmental influences on image quality and expected camera life. The camera has very good thermal behavior, has thermal expansion four times smaller than other cameras, has a thermal expansion coefficient similar to FR4 material (such that there is a reduced risk of solder cracking due to temperature changes), and has better behavior (at about a factor of 10) regarding water/humidity absorption.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A camera for a vision system of a vehicle, said camera comprising:

a housing comprising a front housing portion and a plastic molded rear housing portion mated with said front housing portion;

wherein said front housing portion houses a lens assembly;

wherein said camera is configured to be disposed at a vehicle so as to have a field of view interior or exterior of the vehicle;

wherein a MID (Molded Interconnect Device) frame comprising electrically conductive traces is integrated in said rear housing portion with circuit board connecting elements and connector connecting elements exposed at an inner surface of said rear housing portion;

a connector portion for electrically connecting circuitry of said camera to an electrical connector of the vehicle when said camera is disposed at the vehicle;

wherein said circuitry of said camera is disposed at a circuit board, and wherein said circuit board includes contacts electrically conductively connected to said circuitry;

wherein said contacts of said circuit board contact said exposed circuit board connecting elements of said MID frame of said rear housing portion; and wherein said connector portion comprises connector portion terminals that contact respective connector connecting elements of said MID frame to electrically connect said connector portion terminals to said circuitry of said circuit board via said connector connecting elements of said MID frame, said electrically conductive traces of said MID frame, and said circuit board connecting elements of said MID frame.

2. The camera of claim 1, wherein said electrically conductive traces of said MID frame are not exposed at said inner surface of said rear housing portion.

3. The camera of claim 1, wherein said connector portion comprises a coaxial connector comprising a stamped and folded shield piece having a shield pad and a stamped and bent core piece having a core pad, and wherein said shield pad and said core pad are soldered at said connector connecting elements of said MID frame.

4. The camera of claim 1, wherein said MID frame comprises more than one layer of electrically conductive traces integrated in said rear housing portion.

5. The camera of claim 4, wherein said layers of electrically conductive traces enable crossing routing structures and creating routing layers.

6. The camera of claim 1, wherein said MID frame is established at said inner surface of said rear housing portion.

7. The camera of claim 1, comprising a second circuit board having circuitry and second contacts that electrically connect to exposed second circuit board connecting elements of said MID frame.

8. The camera of claim 7, wherein said second circuit board connecting elements of said MID frame are electrically connected to some of said circuit board connecting elements of said MID frame to electrically connect circuitry of said second circuit board with circuitry of said circuit board.

9. The camera of claim 8, wherein said circuitry of said second circuit board includes an imager comprising an imaging array having a plurality of photosensing elements.

10. The camera of claim 8, wherein at least part of said rear housing portion is overmolded over said circuit boards and said MID frame.

11. The camera of claim 1, comprising a chip that is disposed in said rear housing portion and not disposed at said circuit board, and wherein said chip includes an imager comprising an imaging array having a plurality of photosensing elements.

12. The camera of claim 11, wherein said imager is electrically connected to some of said electrically conductive traces of said MID frame that are exposed at said inner surface of said rear housing portion.

13. The camera of claim 1, wherein said camera is configured to be disposed at the vehicle so as to have a field of view exterior of the vehicle.

14. The camera of claim 13, wherein said camera is part of a surround view system for a vehicle.

15. The camera of claim 1, wherein said camera is configured to be disposed at the vehicle so as to have a field of view interior of the vehicle.

16. The camera of claim 1, wherein said MID frame includes front connecting elements for electrically connecting to connecting elements of said front housing portion when said rear housing portion is mated with said front housing portion, and wherein said connecting elements of said front housing portion are electrically connected to a heating element for heating at least a portion of said lens assembly.

17. A camera for a vision system of a vehicle, said camera comprising:

a housing comprising a front housing portion and a rear housing portion;

wherein said front housing portion houses a lens assembly;

wherein said camera is configured to be disposed at a vehicle so as to have a field of view interior or exterior of the vehicle;

wherein a MID (Molded Interconnect Device) frame comprising electrically conductive traces is integrated in said rear housing portion with first circuit board connecting elements, second circuit board connecting elements, and connector connecting elements exposed at an inner surface of said rear housing portion;

a connector portion for electrically connecting said camera to an electrical connector of the vehicle when said camera is disposed at the vehicle;

wherein first circuitry of said camera is disposed at a first circuit board, and wherein said first circuit board includes first contacts electrically conductively connected to said first circuitry;

wherein second circuitry of said camera is disposed at a second circuit board, and wherein said second circuit board includes second contacts electrically conductively connected to said second circuitry, and wherein said second circuitry includes an imager;

wherein said first contacts of said first circuit board contact said exposed first circuit board connecting elements of said MID frame of said rear housing portion;

wherein said second contacts of said second circuit board contact said exposed second circuit board connecting elements of said MID frame of said rear housing portion;

wherein said connector portion comprises connector portion terminals that contact respective connector connecting elements of said MID frame to electrically connect said connector portion terminals to said first circuitry of said first circuit board via said connector connecting elements of said MID frame, said electrically conductive traces of said MID frame, and said circuit board connecting elements of said MID frame; and wherein at least some of said exposed first circuit board connecting elements are electrically conductively connected to respective ones of said exposed second circuit board connecting elements via said electrically conductive traces of said MID frame to electrically conductively connect first circuitry of said first circuit board with second circuitry of said second circuit board.

18. The camera of claim 17, wherein at least part of said rear housing portion comprises an extruded construction, and wherein said MID frame is established at said extruded construction.

19. A camera for a vision system of a vehicle, said camera comprising:

a housing comprising a front housing portion and a rear housing portion mated with said front housing portion;

wherein said front housing portion houses a lens assembly;

wherein said camera is configured to be disposed at a vehicle so as to have a field of view interior or exterior of the vehicle;

wherein a MID (Molded Interconnect Device) frame comprising electrically conductive traces is integrated in said rear housing portion with first circuit board connecting elements, second circuit board connecting elements, and connector connecting elements exposed at an inner surface of said rear housing portion;

a connector portion for electrically connecting said camera to an electrical connector of the vehicle when said camera is disposed at the vehicle;

wherein first circuitry of said camera is disposed at a first circuit board, and wherein said first circuit board includes first contacts electrically conductively connected to said first circuitry;

wherein second circuitry of said camera is disposed at a second circuit board, and wherein said second circuit board includes second contacts electrically conductively connected to said second circuitry, and wherein said second circuitry includes an imager;

wherein said first circuit board is disposed at a first circuit board support of said rear housing portion and wherein said second circuit board is disposed at a second circuit board support of said rear housing portion;

wherein said second circuit board support is spaced from said first circuit board support and is radially outboard of said first circuit board support;

wherein said first contacts of said first circuit board contact said exposed first circuit board connecting elements of said MID frame of said rear housing portion at said first circuit board support of said rear housing portion;

wherein said second contacts of said second circuit board contact said exposed second circuit board connecting elements of said MID frame of said rear housing portion at said second circuit board support of said rear housing portion;

wherein said connector portion comprises connector portion terminals that contact respective connector connecting elements of said MID frame; and wherein at least some of said exposed first circuit board connecting elements are electrically conductively connected to respective ones of said exposed second circuit board connecting elements via said electrically conductive traces of said MID frame to electrically conductively connect first circuitry of said first circuit board with second circuitry of said second circuit board.

20. The camera of claim 19, wherein said MID frame includes front connecting elements for electrically connecting to connecting elements of said front housing portion when said rear housing portion is mated with said front housing portion, and wherein said connecting elements of said front housing portion are electrically connected to a heating element for heating at least a portion of said lens assembly.

* * * * *